(12) United States Patent
Islam

(10) Patent No.: US 6,813,066 B2
(45) Date of Patent: Nov. 2, 2004

(54) GAIN CONTROL IN NONLINEAR FIBER AMPLIFIER STAGES

(75) Inventor: Mohammed Islam, Allen, TX (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/188,158

(22) Filed: Jul. 1, 2002

(65) Prior Publication Data

US 2003/0016438 A1 Jan. 23, 2003

Related U.S. Application Data

(63) Continuation of application No. 09/866,497, filed on May 25, 2001, which is a continuation of application No. 09/565,776, filed on May 5, 2000, now Pat. No. 6,239,902, which is a continuation of application No. 09/046,900, filed on Mar. 24, 1998, now Pat. No. 6,101,024.

(51) Int. Cl.$^7$ .............................. H04B 10/07; H01S 3/00
(52) U.S. Cl. ................ 359/334; 359/337.1; 359/341.31
(58) Field of Search ........................... 359/334.1, 337.1, 359/341.31, 134, 160; 372/3, 70

(56) References Cited

U.S. PATENT DOCUMENTS

| | | | | |
|---|---|---|---|---|
| 4,616,898 A | * | 10/1986 | Hicks, Jr. ..................... 385/24 |
| 4,922,481 A | * | 5/1990 | Hicks ............................. 370/4 |
| 4,932,739 A | | 6/1990 | Islam ...................... 350/96.15 |
| 4,995,690 A | | 2/1991 | Islam ...................... 350/96.15 |
| 5,020,050 A | | 5/1991 | Islam ............................ 370/4 |
| 5,060,302 A | | 10/1991 | Grimes ....................... 359/135 |
| 5,078,464 A | | 1/1992 | Islam ........................ 385/122 |

(List continued on next page.)

FOREIGN PATENT DOCUMENTS

| | | | | |
|---|---|---|---|---|
| EP | 339840 | * | 11/1919 | |
| EP | 0 829 980 A2 | | 3/1998 | ............ H04J/14/02 |
| EP | 0 959 578 A2 | | 11/1999 | ............ H04J/14/02 |
| JP | 58-208731 | * | 5/1983 | |
| WO | 02/058286 | * | 2/2002 | |

OTHER PUBLICATIONS

Chraplyvy et al., "Equalization in Amplified WDM Lightwave Transmission Systems," IEEE Photonics Technology Letters, vol. 4, No. 8, pp. 920–922, Aug. 1992.

Zou et al., "Compensation of Raman Scattering and EDFA's Nonuniform Gain in Ultra–Long–Distance WDM Links," IEEE Photonics Technology Letters, vol. 8, No. 1, pp. 139–141, Jan. 1996.

Masuda et al., "Ultra–wideband optical amplification with 3dB bandwidth of 65 nm using a gain–equalised two–stage erbium–doped fibre amplifier and Raman amplification," Electronics Letters, vol. 33, No. 9, pp. 73–78, Feb. 24, 1997.

(List continued on next page.)

Primary Examiner—Nelson Moskowitz
(74) Attorney, Agent, or Firm—Baker Botts L.L.P.

(57) ABSTRACT

An apparatus and method are described for exploiting almost the full almost $25^{TH}\%$ of bandwidth available in the low-loss window in optical fibers (from 1430 nm-1620 nm) using a parallel combination of optical amplifiers. The low-loss window at about 1530 nm-1620 nm can be amplified using erbium-doped fiber amplifiers (EDFAs). However, due to the inherent absorption of the erbium at shorter wavelengths, EDFAs cannot be used below about 1525 nm without a significant degradation in performance. For the low-loss window at approximately 1430–1530 nm, amplifiers based on nonlinear polarization in optical fibers can be used effectively. A broadband nonlinear polarization amplifier (NLPA) is disclosed which combines cascaded Raman amplification with parametric amplification or four-wave mixing. In particular, one of the intermediate cascade Raman order wavelengths $\lambda_r$ should lie in close proximity to the zero-dispersion wavelength $\lambda_0$ of the amplifying fiber. For this intermediate Raman order, spectral broadening will occur due to phase-match 15 with four-wave mixing (if $\lambda_r < \lambda_0$) or phase-matched parametric amplification (if $\lambda_r < \lambda_0$). In further cascaded Raman orders, the gain spectrum will continue to broaden due to the convolution of the gain spectrum with the spectrum from the previous Raman order.

33 Claims, 8 Drawing Sheets

U.S. PATENT DOCUMENTS

| | | | |
|---|---|---|---|
| 5,101,456 A | 3/1992 | Islam | 385/27 |
| 5,115,488 A | 5/1992 | Islam et al. | 385/129 |
| 5,224,194 A | 6/1993 | Islam | 385/122 |
| 5,225,922 A | 7/1993 | Chraplyvy et al. | 359/124 |
| 5,369,519 A | 11/1994 | Islam | 359/173 |
| 5,485,536 A | 1/1996 | Islam | 385/31 |
| 5,664,036 A | 9/1997 | Islam | 385/31 |
| 5,696,615 A * | 12/1997 | Alexander | 359/134 |
| 5,778,014 A | 7/1998 | Islam | 372/6 |
| 5,790,289 A | 8/1998 | Taga et al. | 359/124 |
| 5,796,909 A | 8/1998 | Islam | 385/147 |
| 5,801,860 A | 9/1998 | Yoneyama | 359/124 |
| 5,852,510 A | 12/1998 | Meli et al. | 359/341 |
| 5,912,910 A * | 6/1999 | Sanders et al. | 359/326 |
| 5,920,423 A * | 7/1999 | Grubb et al. | 359/341 |
| 5,959,750 A * | 9/1999 | Eskildsen et al. | 359/134 |
| 5,959,766 A | 9/1999 | Otterbach et al. | 359/337 |
| 5,995,275 A | 11/1999 | Sugaya | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,052,393 A | 4/2000 | Islam | 372/6 |
| 6,055,092 A | 4/2000 | Sugaya et al. | 359/337 |
| 6,067,177 A | 5/2000 | Kanazawa | 359/124 |
| 6,081,366 A * | 6/2000 | Kidorf et al. | 359/334 |
| 6,094,296 A | 7/2000 | Kosaka | 359/341 |
| 6,101,024 A * | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,134,034 A | 10/2000 | Terahara | 359/124 |
| 6,185,022 B1 | 2/2001 | Harasawa | 359/124 |
| 6,219,162 B1 | 4/2001 | Barnard et al. | 359/124 |
| 6,239,902 B1 * | 5/2001 | Islam et al. | 359/334 |
| 6,239,903 B1 | 5/2001 | Islam et al. | 359/337 |
| 6,271,945 B1 | 8/2001 | Terahara | 359/124 |
| 6,282,002 B1 | 8/2001 | Grubb et al. | 359/160 |
| 6,320,884 B1 * | 11/2001 | Kerfoot, III et al. | 372/334 |
| 6,335,820 B1 | 1/2002 | Islam | 359/334 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,388,801 B1 | 5/2002 | Sugaya et al. | 359/334 |
| 6,404,523 B1 | 6/2002 | Morikawa et al. | 359/124 |
| 6,417,959 B1 | 7/2002 | Bolshtyansky et al. | 359/334 |
| 2001/0050802 A1 | 12/2001 | Namiki et al. | 359/337.11 |
| 2002/0048062 A1 | 4/2002 | Sakamoto et al. | 359/124 |
| 2002/0060821 A1 | 5/2002 | Manna et al. | 359/124 |

OTHER PUBLICATIONS

Masuda et al., "75–nm 3–dB Gain–band Optical Amplification with Erbium–Doped Fluoride Fibre Amplifiers and Distributed Raman Amplifiers in 9 ×2.5–Gb/s WDM Transmission Experiment," ECOC Conference, vol. 5, No. 448, pp. 73–76 plus 2 back pages, Sep. 22–25, 1997.

Tonguz et al., "Gain Equalization of EDFA Cascades," Journal of Lightwave Technology, vol. 15, No. 10, pp. 1832–1841, Oct. 1997.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Letellier et al., "Access to Transmission Performance Margins Through Pre–emphasis Adjustment in WDM Systems," ECOC, pp. 275–276, Sep. 20–24, 1998.

Manna et al., "Modeling of Penalties on Chains of Optical Amplifiers with Equalizing Filters," Journal of Lightwave Technology, vol. 18, No. 3, pp. 295–300, Mar. 2000.

Fludger et al., "Fundamental Noise Limits in Broadband Raman Amplifiers," OFC, pp. MA5/1–MA5/3, 2001.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Scheerer et al., "SRS Crosstalk in Preemphasized WDM Systems," pp. WM28–1/293–WM28–3/295.

Pending patent application; U.S. Ser. No. 09/766,489; entitled "Nonlinear Polarization Amplifiers in Nonzero Dispersion Shifted Fiber," by Mohammed N. Islam, Filed Jan. 19, 2001.

Pending patent application; U.S. Ser. No. 09/765,972; entitled "S+ Band Nonlinear Polarization Amplifiers," by Mohammed N. Islam, Filed Jan. 19, 2001.

Pending patent application; U.S. Ser. No. 09/768,367, entitled "All Band Amplifier," pp. 1–57, by Mohammed N. Islam, Filed Jan. 22, 2001.

Pending patent application; U.S. Ser. No. 09/800,085; entitled "Dispersion Compensating Nonlinear Polarization Amplifier," by Mohammed N. Islam, Filed Mar. 5, 2001.

Pending patent application; U.S. Ser. No. 09/811,067, entitled "Method and System for Reducing Degradation of Optical Signal to Noise Ratio," by Michel W. Chbat et al., Filed Mar. 16, 2001.

Pending patent application; U.S. Ser. No. 09/811,103; entitled "System and Method for Wide Band Raman Amplification," by Mohammed N. Islam et al., Filed Mar. 16, 2001.

Pending patent application; U.S. Ser. No. 09/916,454; entitled "System and Method for Controlling Noise Figure," pp. 1–51, by Mohammed N. Islam et al., Filed Jul. 27, 2001.

Pending patent application; U.S. Ser. No. 09/971,436; entitled "High Reliability Optical Amplification," by Mohammed N. Islam, Filed Oct. 5, 2001.

Pending patent application; U.S. Ser. No. 10/033,848; entitled "Broadband Sagnac Raman Amplifiers and Cascade Lasers," by Mohammed N. Islam, Filed Dec. 19, 2001.

Pending patent application; U.S. Ser. No. 10/028,576; entitled "Optical Amplification Using Launched Signal Powers Selected as a Function of a Noise Figure," pp. 1–77, by Mohammed N. Islam et al., Filed Dec. 20, 2001.

Pending patent application; U.S. Ser. No. 10/100,591; entitled "System and Method for Managing System Margin," pp. 1–89, by Mohammed N. Islam, Filed Mar. 15, 2002.

Pending patent application; U.S. Ser. No. 10/100,587; entitled "Fiber Optic Transmission System with Low Cost Transmitter Compensation," by Mohammed N. Islam, Filed Mar. 15, 2002.

Pending patent application; U.S. Ser. No. 10/100,700; entitled "Rack System for an End Terminal in an Optical Communication Network," pp. 1–74, Mohammed N. Islam et al., Filed Mar. 15, 2002.

Pending patent application; U.S. Ser. No. 10/116,487; entitled "Fiber Optic Transmission System for a Metropolitan Area Network," pp. 1–54, by Mohammed N. Islam, Filed Apr. 3, 2002.

Pending patent application; U.S. Ser. No. 10/187,672; entitled "Gain Control in Nonlinear Polarization Amplifier Stages," by Mohammed Islam, Filed Jul. 1, 2002.

Pending patent application; U.S. Ser. No. 10/188,007; entitled "Multiple Wavelength Pumping of Raman Amplifier Stages," by Mohammed N. Islam, Filed Jul. 1, 2002.

Pending patent application; U.S. Ser. No. 10/211,209; entitled "Active Gain Equalization," by Mohammed N. Islam et al., Filed Aug. 2, 2002.

* cited by examiner $2g_{PEAK} = \gamma P$ $\Delta k_{PEAK} = -2\gamma P$ $\Delta k_{MAX} = -4\gamma P$

GAIN CONTROL IN NONLINEAR FIBER AMPLIFIER STAGES

CROSS-REFERENCE TO RELATED CASES

This application is a continuation of U.S. patent application Ser. No. 09/866,497, filed May 25, 2001 and entitled "NONLINEAR FIBER AMPLIFIERS USED FOR A 1430–1530nm LOW-LOSS WINDOW IN OPTICAL FIBERS," which is a continuation of U.S. patent application Ser. No. 09/565,776, filed May 5, 2000, now U.S. Pat. No. 6,239,902, which is a continuation of U.S. patent application Ser. No. 09/046,900 filed Mar. 24, 1998, now U.S. Pat. No. 6,101,024.

FIELD OF THE INVENTION

The present invention relates generally to optical amplifiers used in fiber-optics for telecommunications, cable television and other fiber-optics applications. More particularly, the invention relates to an optical fiber amplifier and method for producing an amplified broadband output from an optical signal comprising a wavelength in the range of 1430–1530 nm.

BACKGROUND OF THE INVENTION

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers, two key technologies have been developed and used in the telecommunication industry: optical amplifiers and wavelength-division multiplexing (WDM). Optical amplifiers boost the signal strength and compensate for inherent fiber loss and other splitting and insertion losses. WDM enables different wavelengths of light to carry different signals parallel over the same optical fiber. Although WDM is critical in that it allows utilization of a major fraction of the fiber bandwidth, it would not be cost-effective without optical amplifiers. In particular, a broadband optical amplifier that permits simultaneous amplification of many WDM channels is a key enabler for utilizing the full fiber bandwidth.

Silica-based optical fiber has its lowest loss window around 1550 nm with approximately 25 THz of bandwidth between 1430 and 1620 nm. For example, FIG. 1 illustrates the loss profile of a 50 km optical fiber. In this wavelength region, erbium-doped fiber amplifiers (EDFAS) are widely used. However, as indicated in FIG. 2, the absorption band of a EDFA nearly overlaps its the emission band. For wavelengths shorter than about 1525 nm, erbium-atoms in typical glasses will absorb more than amplify. To broaden the gain spectra of EDFAs, various dopings have been added. For example, as shown in FIG. 3a, codoping of the silica core with aluminum or phosphorus broadens the emission spectrum considerably. Nevertheless, as depicted in FIG. 3b, the absorption peak for the various glasses is still around 1530 nm.

Hence, broadening the bandwidth of EDFAs to accommodate a larger number of WDM channels has become a subject of intense research. As an example of the state-of-the-art, Y. Sun et al. demonstrated in Electronics Letters, Vol. 33, No. 23, pp. 1965–67 (1997), a two-band architecture for an ultra-wideband EDFA with a record optical bandwidth of 80 nm. To obtain a low noise figure and high output power, the two bands share a common first gain section and have distinct second gain sections. The 80 nm bandwidth comes from one amplifier (so-called conventional band or C-band) from 1525.6 to 1562.5 nm and another amplifier (so-called long band or L-band) from 1569.4 to 1612.8 nm. As another example, M. Yamada et al. reported in Electronics Letters, Vol. 33, No. 8, pp. 710–711 (1997), a 54 nm gain bandwidth achieved with two EDFAs in a parallel configuration, i.e., one optimized for 1530–1560 nm and the other optimized for 1576–1600 nm. As yet another example, H. Masuda et al. reported in Electronics Letters, Vol. 33, No. 12, pp. 1070–72 (1997), a 52 nm EDFA that used two-stage EDFAs with an intermediate equalizer.

These recent developments illustrate several points in the search for broader bandwidth amplifiers for the low-loss window in optical fibers. First, bandwidth in excess of 40–50 nm require the use of parallel combination of amplifiers even with EDFAS. Second, the 80 nm bandwidth achieved by Y. Sun et al., may be very close to the theoretical maximum. The short wavelength side at about 1525 nm is limited by the inherent absorption in erbium, and long wavelength side is limited by bend-induced losses in standard fibers at above 1620 nm. Therefore, even with these recent advances, half of the bandwidth of the low-loss window, i.e., 1430–1530 nm, remains without an optical amplifier.

SUMMARY OF THE INVENTION

It is an object of the present invention to provide an optical amplifier for a range of wavelengths between about 1430 nm and 1530 nm.

It is another object of the present invention to provide a broadband nonlinear polarization amplifier (NLPA) for generating a broadband output from an optical signal having a wavelength between about 1430 nm and 1530 nm.

It is yet another object of the present invention to provide a parallel optical amplification apparatus having a combination of the NLPA and EDFA for the almost full 25 THz bandwidth between 1430 nm and 1620 nm in the low-loss window of optical fibers.

In accordance with the invention, a broadband NLPA is implemented by using a combination of cascaded Raman amplification and either parametric amplification (PA) or four-wave mixing (4WM) in optical fibers. To achieve the broad bandwidth, one intermediate order of the Raman cascade is arranged to be at a close proximity to the zero-dispersion wavelength of an amplifying fiber. This intermediate order phase matches PA (if its wavelength is greater than the zero-dispersion wavelength) or 4WM (if its wavelength is less than the zero-dispersion wavelength). PA/4WM generates sidebands and broaden the pump band. In subsequent Raman orders, the gain bandwidth is further broadened due to the convolution of the Raman gain band with the pump band. To produce an amplified broadband signal out of the NLPA of the invention, the optical signal to be amplified must have a wavelength greater than the zero-dispersion wavelength, which in turn must be greater than the pumping wavelength from a pumping means of the NLPA.

In one embodiment, a broadband NLPA employs a 1240 nm pump and an open-loop fiber with a zero-dispersion wavelength corresponding to one of the Raman orders (e.g., either 1310 nm or 1390 nm or dispersion-flattened in between). Another embodiment uses a Sagnac Raman cavity that is pumped at either 1117 nm or 1240 nm. Feedback by the Sagnac Raman cavity reduces the required pump power, and the broadband cavity design supports much of the generated bandwidth.

The present invention also relates to a parallel optical amplification apparatus having a combination of optical amplifiers. In one embodiment, the parallel optical amplification apparatus comprises two parallel stages of NLPAs with one NLPA optimized for 1430–1480 nm and the other for 1480–1530 nm. In another embodiment, the full 25 THz of the low-loss window of approximately 1430 nm to 1620 nm in optical fibers is exploited by using a parallel combination of a NLPA of the invention and a EDFA.

NLPAs have the advantage that the gain band is set by the pumping wavelengths, and gain can be provided over virtually the entire transparency region in optical fibers (i.e., between 300 nm and 2000 nm). Moreover, because NLPAs utilize inherent properties of glass fibers, NLPAs can be used even in existing fibers by modifying the terminal ends. Hence, NLPAs are fully compatible with fiber-optic systems and can take advantage of the mature fiber-optic technologies.

BRIEF DESCRIPTION OF THE DRAWINGS

These and other objects, features and elements of the present invention will be better understood from the following detailed description of preferred embodiments of the invention in which.

DETAILED DESCRIPTION OF PREFERRED EMBODIMENTS

Figure 1:
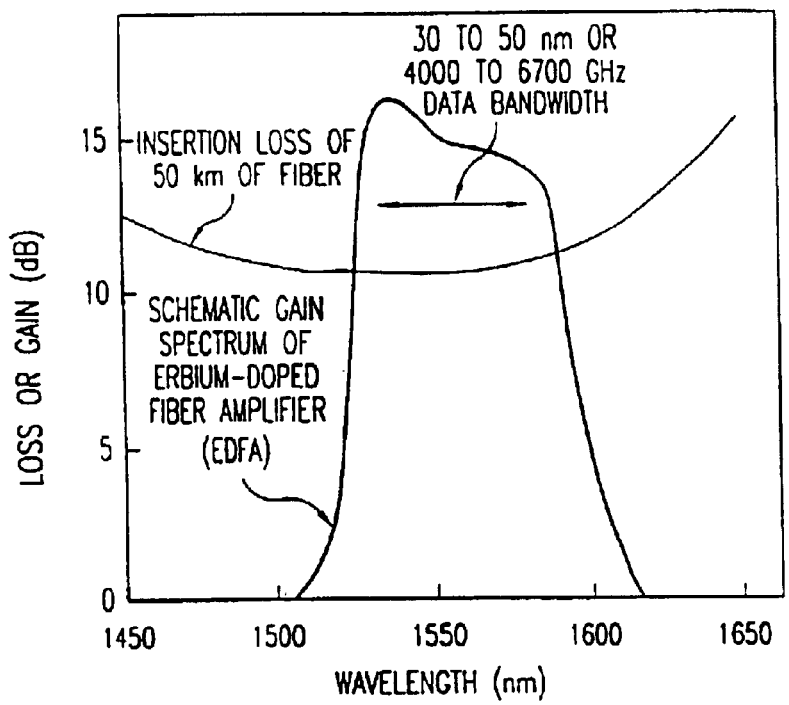
FIG. 1 depicts the loss profile of a 50 km fiber and the gain band of a typical EDFA.
Figure 2:
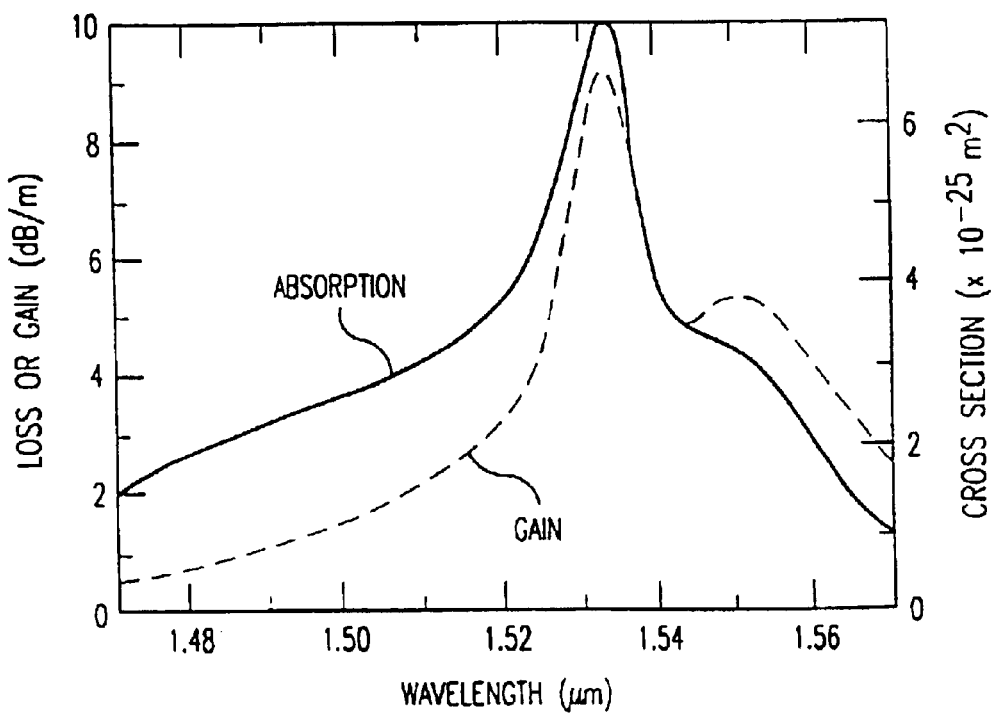
FIG. 2 depicts absorption and gain spectra of an EDFA.
Figure 3A:
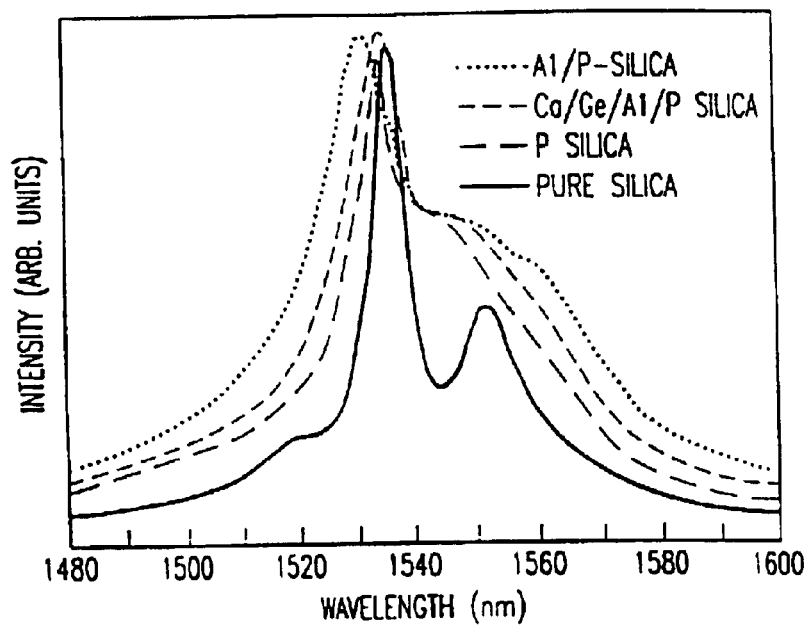
FIG. 3a depicts emission spectra of four EDFAs with different core compositions.
Figure 3B:
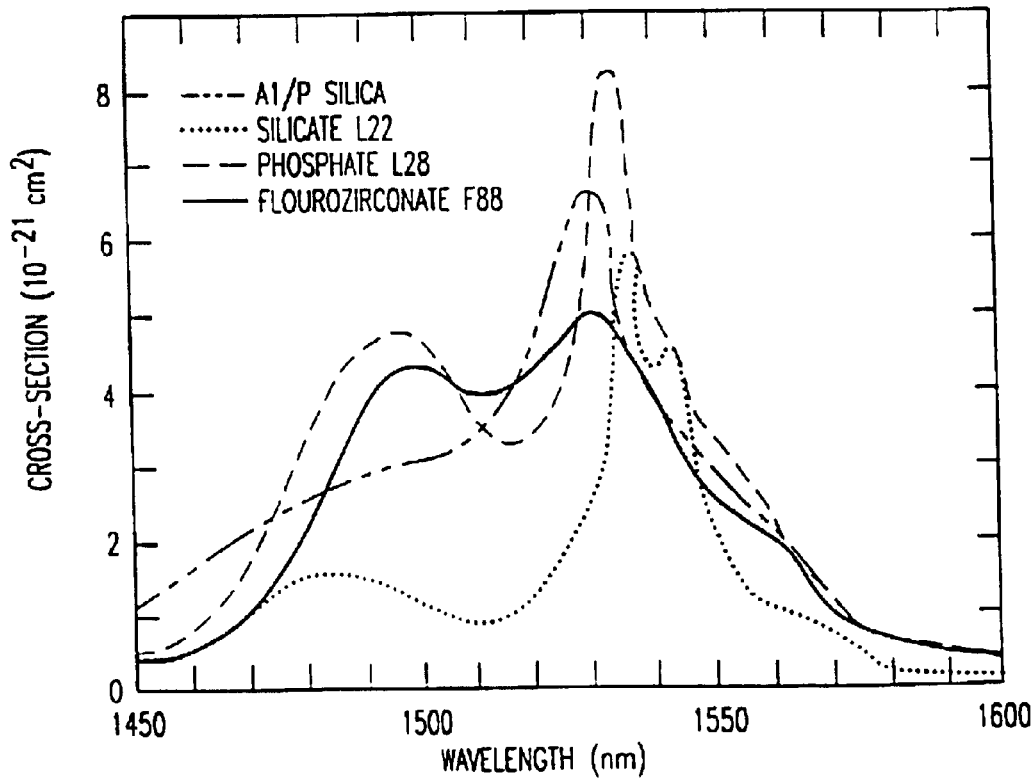
FIG. 3b depicts absorption cross-section of erbium-doped glass of different compositions.

The present invention provides a structure for exploiting almost the full 25 THz of bandwidth available in the low-loss window of optical fibers from 1430 nm to 1620 nm. The broadband NLPA amplifier of the invention combines Raman amplification with either PA or 4WM to achieve bandwidth performance improvements that neither technology by itself has heretofore been able to deliver.

More specifically, the broadband NLPA of the invention comprises an input port for inputting an optical signal having a wavelength $\lambda$, a distributed gain medium for receiving the optical signal and amplifying and spectrally broadening the same therein through nonlinear polarization, a pumping means operated at wavelength $\lambda_p$ for generating a pumping light to pump the distributed gain medium, and an output port for outputting the amplified and spectrally broadened optical signal. The distributed gain medium has zero-dispersion at wavelength $\lambda_0$ such that $\lambda \geq \lambda_0 \geq \lambda_p$. The pumping light cascades through the distributed gain medium a plurality of Raman orders including an intermediate order having a wavelength $\lambda_r$ at a close proximity to the zero-dispersion wavelength $\lambda_0$ phase match four-wave mixing (if $\lambda_r < \lambda_0$) or parametric amplification (if $\lambda_r > \lambda_0$).

A first embodiment of the NLPA uses open-loop amplification with an optical fiber gain medium. A pump source operated at 1240 nm is used. The pump may be retro-reflected to increase the conversion efficiency. A second embodiment of the NLPA uses a Sagnac Raman cavity that is pumped at 1240 nm. Feedback in the Sagnac Raman cavity reduces the required pump power, and the broadband cavity design supports much of the generated bandwidth. A third embodiment of the NLPA uses a Sagnac Raman cavity pumped at 1117 nm for a very broadband operation.

The present invention also relates to a parallel optical amplification apparatus having a combination of optical amplifiers. In one embodiment, the parallel optical amplification apparatus comprises two parallel stages of NLPAs with one NLPA optimized for 1430 to 1480 nm and the other for 1480 to 1530 nm. In another embodiment, the full 25 THz of the low-loss window in optical fibers is exploited by using a parallel combination of a Raman amplifier and a rare earth doped amplifier. Preferably, an NLPA of the invention is used cover the low-loss window of approximately 1430 nm to 1530 nm, and an EDFA is used to cover the low-loss window of approximately 1530 nm to 1620 nm.

To provide a better understanding of the amplification mechanisms at work in the present invention, we first describe stimulated Raman scattering, Raman cascading, PA and 4WM. Stimulated Raman scattering effect, PA and 4WM are the result of third-order nonlinearities that occur when a dielectric material such as an optical fiber is exposed to intense light. The third-order nonlinear effect is proportional to the instantaneous light intensity.

1. Stimulated Raman Scattering

Figure 4:
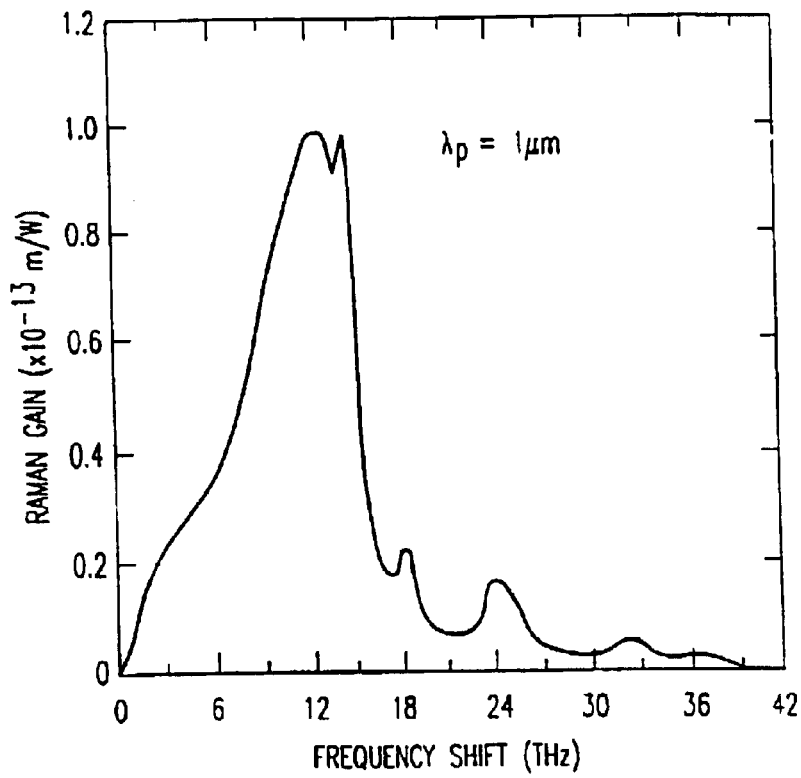
FIG. 4 depicts a measured Raman-gain spectrum for fused silica at a pump wavelength of 1000 nm.

Stimulated Raman scattering is an important nonlinear process that turns optical fibers into amplifiers and tunable lasers. Raman gain results from the interaction of intense light with optical phonons in silica fibers, and Raman effect leads to a transfer of energy from one optical beam (the pump) to another optical beam (the signal). The signal is downshifted in frequency (or upshifted in wavelength) by an amount determined by vibrational modes of silica fibers. The Raman gain coefficient $g_r$ for the silica fibers is shown in FIG. 4. Notably, the Raman gain $g_r$ extends over a large frequency range (up to 40 THz) with a broad peak centered at 13.2 THz (corresponding to a wavelength of 440 cm$^{-1}$). This behavior over the large frequency range is due to the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, there is no excessive loss in the absence of pump power—an important consideration for system reliability.

2. Raman Cascading

Cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain profile has a peak centered at 13.2 THz in silica fibers, one Raman order can be arranged to be separated from the previous order by 13.2 THz.

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Moreover, cascading enables Raman amplification over a wide range of different wavelengths. By varying the pump wavelength or by using cascaded orders of Raman gain, the gain can be provided over the entire telecommunications window between 1300 nm and 1600 nm.

3. Parametric Amplification and Four-Wave Mixing

PA/4WM involve two pump (P) photons that create Stokes (S) and anti-Stokes (A) photons. Both PA/4WM and Raman amplification arise from the third order susceptibility $X^{(3)}$ in optical fibers. More specifically, the real part of $X^{(3)}$ the so-called nonlinear index of refraction $n_2$, is responsible for PA/4WM, while the imaginary part of $X^{(3)}$ associated with molecular vibrations corresponds to the Raman gain effect. In silica fibers, about ⅘ths of the $n_2$ is an electronic, instantaneous nonlinearity caused by ultraviolet resonances, while about ⅕th of $n_2$ arises from Raman-active vibrations, e.g., optical phonons (see further description in M. N. Islam, Ultrafast Fiber Switching Devices and Systems, Cambridge University Press, 1992). The imaginary part of this latter contribution corresponds to the Raman gain spectrum of FIG. 4.

Whereas Raman amplification is attractive for providing optical gain, PA/4WM offers an efficient method to broaden the bandwidth of the optical gain. PA/4WM has a much smaller frequency separation between pump and signal than Raman amplification, and the frequency difference may depend on the pump intensity. Just as in Raman amplification, the main advantage of PA/4WM gain is that it is present in every fiber. However, unlike the Raman effect, both PA and 4WM require phase-matching. 4WM is usually inefficient in long fibers due to the requirement for phase-matching. However, PA can act as self-phase-matched because the nonlinear index of refraction is used to phase match the pump and sidebands. This is particularly true when operating near the zero-dispersion wavelength in fibers. When 4WM and PA occur near the zero-dispersion wavelength of a single-mode fiber, phase-matching becomes automatic in the fiber. In 4WM, sidebands are generated without gain when the pump wavelength falls in the normal dispersion regime (where the pumping wavelength is shorter than the zero-dispersion wavelength). PA is 4-photon amplification in which the nonlinear index of refraction is used to phase match the pump and sidebands. For PA the pump wavelength must lie in the anomalous group velocity regime (i.e., where the pumping wavelength is longer than the zero-dispersion wavelength) and proper phase matching requires that pump and signal be co-propagating.

To illustrate the PA/4WM gain, consider the gain coefficient as derived in R. H. Stolen and J. E. Bjorkholm, IEEE J. Quantum Elect., QE-18, 1062 (1982):

$$g = \sqrt{(\gamma P)^2 - \left[\left(\frac{\Delta k}{2}\right) + \gamma P\right]^2} \quad (1)$$

The first term under the square root sign corresponds to the third order nonlinearity that couples the pump photons to the sidebands. The second term corresponds to the phase mismatch between the waves and it consists of two parts: one due to the wave-vector mismatch at the different wavelengths and the other due to the increase in nonlinear index induced by the pump. The nonlinearity parameter is defined as $$\gamma = \frac{\omega}{c}\frac{n_2}{A_{\text{eff}}} = \frac{2\pi}{\lambda}\frac{n_2}{A_{\text{eff}}} \quad (2)$$

Also, assuming that we are operating near the zero-dispersion wavelength, the propagation constant can be expanded as $$\Delta k = -\frac{\lambda^2}{2\pi c}\left[\frac{dD}{d\lambda}\right]_{\lambda_*}(\lambda_p - \lambda_o)\Omega^2 \quad (3)$$

where $$\Omega = \omega_p - \omega_s = \omega_a - \omega_p. \quad (4)$$

Figure 5:
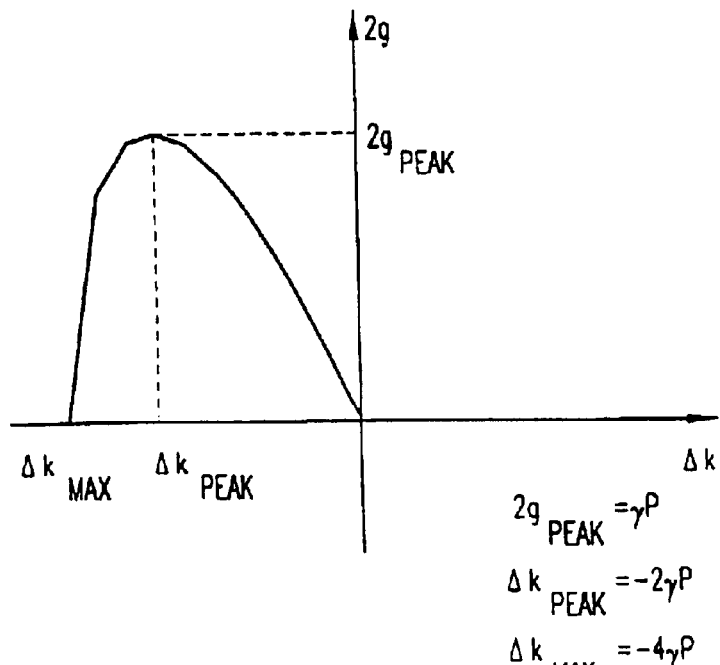
FIG. 5 plots power gain coefficient 2 g versus phase vector mismatch $\Delta k$ for parametric amplification.

When the pump wavelength falls in the normal dispersion regime, then D<0, ∂D/2λ>0, ($\lambda_p - \lambda_o$)<0, so that Δk>0. In this case, g is always imaginary, and there is no gain during the sideband generation process. This corresponds to the case of 4WM. If operation is in the anomalous group velocity dispersion regime, then D>0, ∂D/2λ>0, ($\lambda_p - \lambda_o$)>0, so that Δk<0. This is the regime of PA, and the nonlinearity helps to reduce the phase mismatch (i.e., the two parts in the second term in Equation (1) are of opposite sign). There is gain for PA, and the gain is tunable with the pump power. As an example, the power gain coefficient 2 g is plotted schematically in FIG. 5 for operation in the anomalous group velocity regime. The peak gain ($g_{peak} = \gamma P$) occurs at $\Delta k_{peak} = -2\gamma P$. The range over which the gain exists is given by 0>Δk>−4γP. Thus, the peak gain is proportional to the pump power, and the Δk range is determined by the pump power. Consequently, from Equation (2) we see that the bandwidth can be increased by increasing the pump power, increasing the nonlinear coefficient $n_2$ or decreasing the effective area $A_{\text{eff}}$. Alternately, for a given required frequency range over which gain is required, the pump requirements can be reduced by increasing the effective nonlinearity ($n_2/A_{\text{eff}}$).

4. Broadband NLPA by Combining Raman and Either PA or 4WM

This invention leads to broadband gain for cascaded Raman amplification by arranging at least one intermediate Raman cascade order at a close proximity to the zero-dispersion wavelength $\lambda_0$ (e.g., within ±5 nm of $\lambda_0$, optimally within ±2 nm). Either 4WM (if $\lambda_r<\lambda_0$) or PA (if $\lambda_r>\lambda_0$) will lead to spectral broadening of that particular Raman order. Then, in subsequent Raman orders the bandwidth will grow even further. It is further advantageous if the cascade Raman wavelength $\lambda_r$ lies to the long wavelength side of $\lambda_0$ (i.e., in the anomalous dispersion regime), so that parametric amplification can occur.

Figure 6:
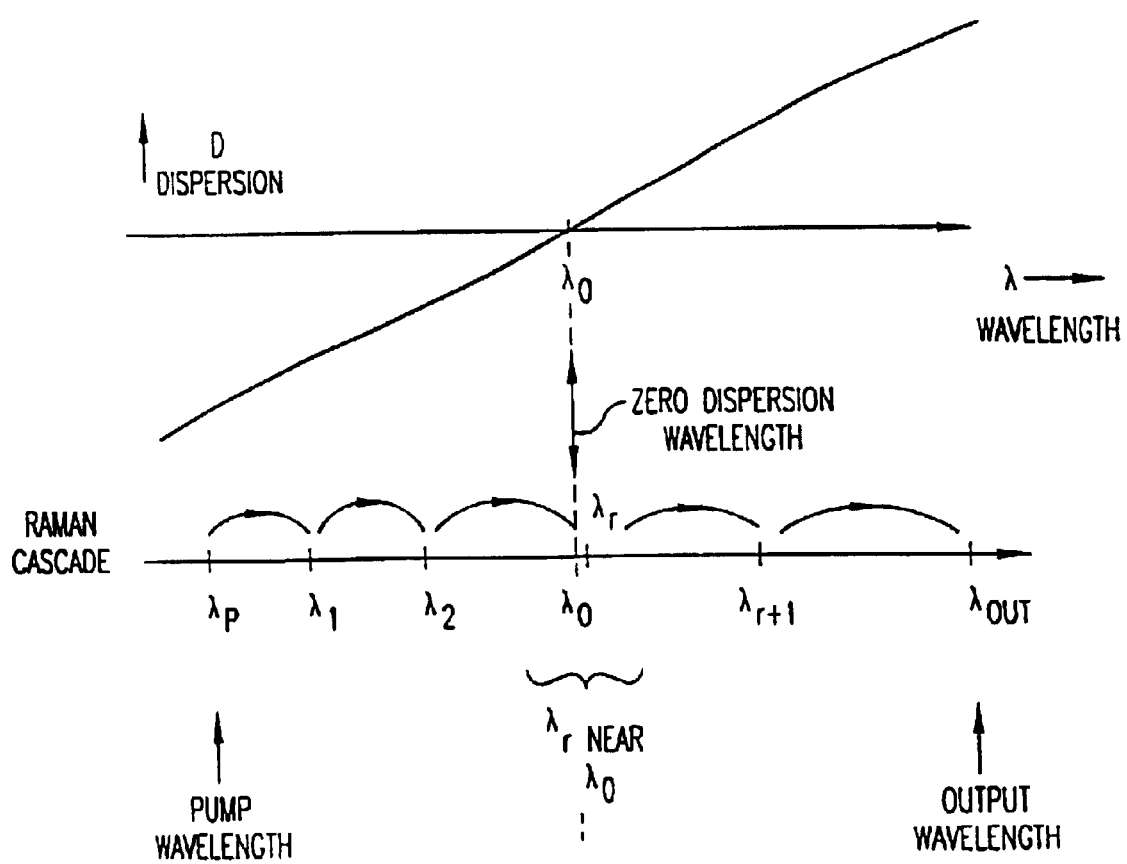
FIG. 6 demonstrates basic concepts of the NLPA of the invention.

The basic concept of the broadband NLPA is illustrated in FIG. 6. Starting from the pump wavelength $\lambda_p$, cascaded Raman amplification can be used in the first few stages. This is only if the pump is more than one Raman shift or 13.2 THz away from the zero-dispersion wavelength. (If it is desired to keep higher efficiency in these initial steps, a narrow band cavity design can be used, such as designs based on gratings or wavelength selective couplers.)

The key to the invention of broadening the gain bandwidth is that one of the intermediate Raman cascade orders lies at a close proximity to the zero-dispersion wavelength $\lambda_0$. By operating close to $\lambda_0$, it almost automatically phase-matches either 4WM or PA. In the subsequent cascaded Raman orders, the gain bandwidth may continue to broaden. This occurs because the effective gain bandwidth of Raman is the convolution of the bandwidth of the pump (in this case, the previous Raman cascade order) with the Raman gain curve. In this regard, see discussion in R. H. Stolen, et al., "Development of the stimulated Raman spectrum in single-mode silica fibers," Journal of the Optical Society of America B, Vol. 1 (1984), pp. 652–57. Thus, the basic idea is to take advantage of the property of Raman amplification that the gain spectrum follows the pump spectrum. As the pump wavelength changes, the Raman gain changes as well, separated by the distance of optical phonon energy which in silica fibers is an approximately 13.2 THz down-shift in frequency.

If the fiber is conventional so-called standard fiber, then zero-dispersion wavelength $\lambda_0$ is about 1310 nm. On the other hand, for dispersion-shifted fiber the zero-dispersion wavelength $\lambda_0$ can shift to longer wavelengths by adding waveguide dispersion. Alternately, a dispersion-flattened fiber could be used for low dispersion values over one or more of the Raman cascade orders. The additional advantage of using dispersion-flattened fiber is that the dispersion slope is small, so the gain bandwidth will be even larger (c.f. Equations (1) and (3)).

The Raman gain spectrum can follow the pump spectrum only so long as there is nothing in the Raman cavity to restrict the bandwidth of the subsequent orders. Therefore, for these higher cascade orders Raman laser schemes, it is not desirable to use either gratings or wavelength selective couplers. On the other hand, the broadband cavity design of the Sagnac Raman amplifier and laser lends itself naturally to increased bandwidth by tailoring the pump spectrum. A single-pass fiber design constitutes the broadest bandwidth design. However, a broadband cavity such as the Sagnac Raman cavity is advantageous because the feedback is used to lower the threshold and the required pump power. Also, it should be noted that broadening the bandwidth leads to a drop in efficiency, so the pump powers are already higher for the broadband cavity designs.

5. Example of NLPA Gain Broadening from PA and Cascaded Raman

To illustrate the cascaded Raman amplification to reach the 1430–1530 nm range of the low-loss window, consider pumping with a commercially available cladding-pumped fiber laser, which operates around 1060 to 1140 nm. The various Raman orders, each separated by 13.2 Thz from the previous order, are set forth in Table 1.

TABLE 1

Various Raman orders when pumping between 1060 and 1140 nm (separation of 13.2 THZ between orders)

| Wavelength (nm) | Δλ |
|---|---|
| 1060.00 | 51.86 |
| 1111.86 | 57.19 |
| 1169.05 | 63.39 |
| 1232.44 | 70.66 |
| 1303.11 | 79.26 |
| 1382.37 | 89.53 |
| 1471.90 | 101.93 |
| 1573.82 | 117.09 |
| 1070.00 | 52.86 |
| 1122.86 | 58.36 |
| 1181.22 | 64.76 |
| 1245.98 | 72.27 |
| 1318.25 | 81.17 |
| 1399.42 | 91.82 |
| 1491.25 | 104.72 |
| 1595.97 | 120.54 |
| 1080.00 | 53.88 |
| 1133.88 | 59.54 |
| 1193.42 | 66.14 |
| 1259.56 | 73.90 |
| 1333.47 | 83.11 |
| 1416.58 | 94.16 |
| 1510.74 | 107.57 |
| 1618.32 | 124.07 |
| 1090.00 | 54.91 |
| 1144.91 | 60.74 |
| 1205.65 | 67.54 |
| 1273.19 | 75.56 |
| 1348.74 | 85.09 |
| 1433.83 | 96.55 |
| 1530.38 | 110.49 |
| 1640.87 | 127.69 |
| 1100.00 | 55.95 |
| 1155.95 | 61.94 |
| 1217.89 | 68.96 |
| 1286.85 | 77.24 |
| 1364.09 | 87.10 |
| 1451.19 | 98.98 |
| 1550.17 | 113.47 |
| 1663.64 | 131.40 |
| 1110.00 | 57.00 |
| 1167.00 | 63.17 |
| 1230.16 | 70.40 |
| 1300.56 | 78.94 |
| 1379.50 | 89.14 |
| 1468.64 | 101.46 |
| 1570.10 | 116.52 |
| 1686.62 | 135.20 |
| 1117.00 | 57.74 |
| 1174.74 | 64.03 |
| 1238.77 | 71.41 |
| 1310.18 | 80.15 |
| 1390.33 | 90.59 |
| 1480.92 | 103.22 |
| 1584.15 | 118.69 |
| 1702.84 | 137.92 |
| 1120.00 | 58.05 |
| 1178.05 | 64.40 |
| 1242.46 | 71.85 |
| 1314.31 | 80.67 |
| 1394.98 | 91.22 |
| 1486.20 | 103.99 |
| 1590.19 | 119.63 |
| 1709.82 | 139.10 |
| 1130.00 | 59.12 |
| 1189.12 | 65.65 |
| 1254.77 | 73.32 |
| 1328.10 | 82.43 |
| 1410.53 | 93.33 |
| 1503.86 | 106.56 |
| 1610.42 | 122.81 |

TABLE 1-continued

Various Raman orders when pumping between 1060 and 1140 nm (separation of 13.2 THZ between orders)

| Wavelength (nm) | Δλ |
|---|---|
| 1733.24 | 143.09 |
| 1140.00 | 60.20 |
| 1200.20 | 66.92 |
| 1267.12 | 74.82 |
| 1341.93 | 84.21 |
| 1426.14 | 95.48 |
| 1521.62 | 109.18 |
| 1630.81 | 126.07 |
| 1756.87 | 147.19 |

To obtain gain between 1430 nm and 1520 nm, the pump is operated between 1090 nm and 1140 nm, and five cascaded Raman orders are used to reach the desired wavelength. To make use of the broadening from PA or 4WM, a pumping scheme is selected in the middle of this range, i.e., starting with a pump wavelength of 1117 nm. Then, the various Raman orders land at approximately 1175 nm, 1240 nm, 1310 nm, 1390 nm and finally 1480 nm. In particular, the third Raman frequency (1310 nm) passes through the zero-dispersion point of a standard fiber, and the next order (1390 nm) could be close if the fiber is dispersion shifted. Therefore, a broadband gain is expected for wavelengths in the 1430–1530 nm range centered around 1480 nm by using a fiber with a standard dispersion and a pump wavelength of 1117 nm, 1175 nm or 1240 nm.

Figure 7:
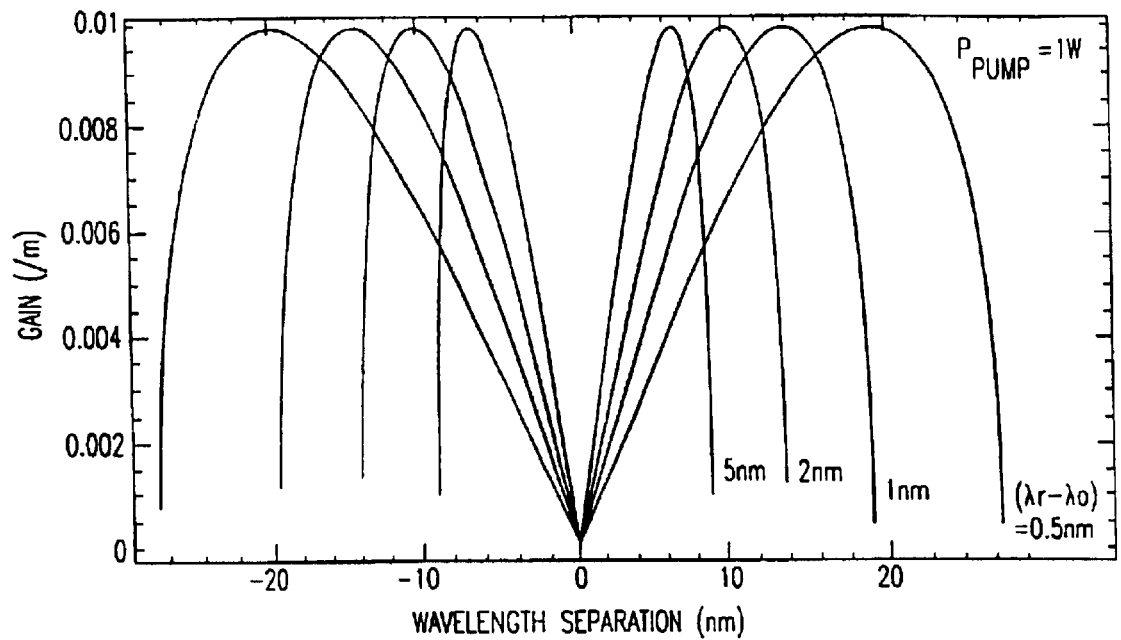
FIG. 7 illustrates the spectral broadening and gain expected from PA for a pump power of 1W and different separations between the pump and zero-dispersion wavelength.
Figure 8:
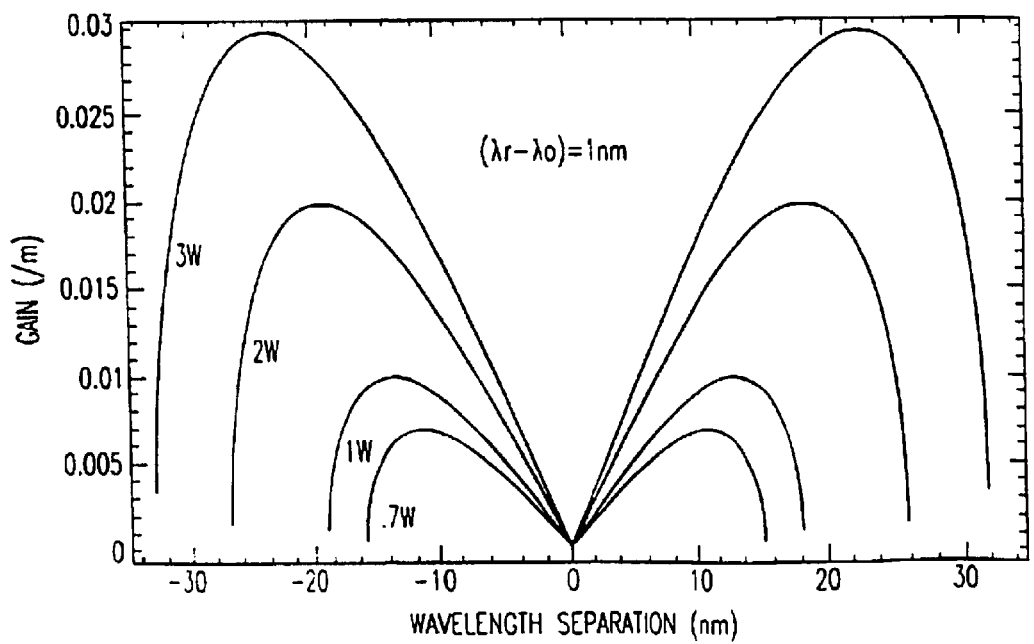
FIG. 8 illustrates the spectral broadening and gain expected from PA for a pump and zero-dispersion wavelength separation of 1 nm and for varying pump powers.

Next, consider the broadening expected from PA. Assume that a standard fiber is used and the pump wavelength starts at 1117 nm. The calculations use Equations (1–4) with the following typical parameters for high-Raman cross-section fiber: $\lambda_0 = 1310$ nm, $\gamma = 9.9$ $W^{-1}km^{-1}$, and a dispersion slope of 0.05 ps/nm-km. In FIG. 7, the gain coefficient for PA is plotted versus wavelength at a pump power of 1W and wavelength separations $\lambda_r - \lambda_0$ of 0.5, 1, 2 and 5 nm. For a wavelength separation of 2 nm, the PA peak gain occurs at ±10 nm, so the spectral broadening is over 20 nm. The closer the pump wavelength approaches the zero-dispersion wavelength, the wider the gain bandwidth. In addition, FIG. 8 plots the gain versus wavelength for a separation of $(\lambda_r - \lambda_0) = 1$ nm and pump powers of 0.7, 1, 2, and 3W. The peak gain increases directly proportional to the pump power, while the bandwidth increases as the square root of pump power.

6. Preferred Embodiments of NLPA Amplifiers

Figure 9:
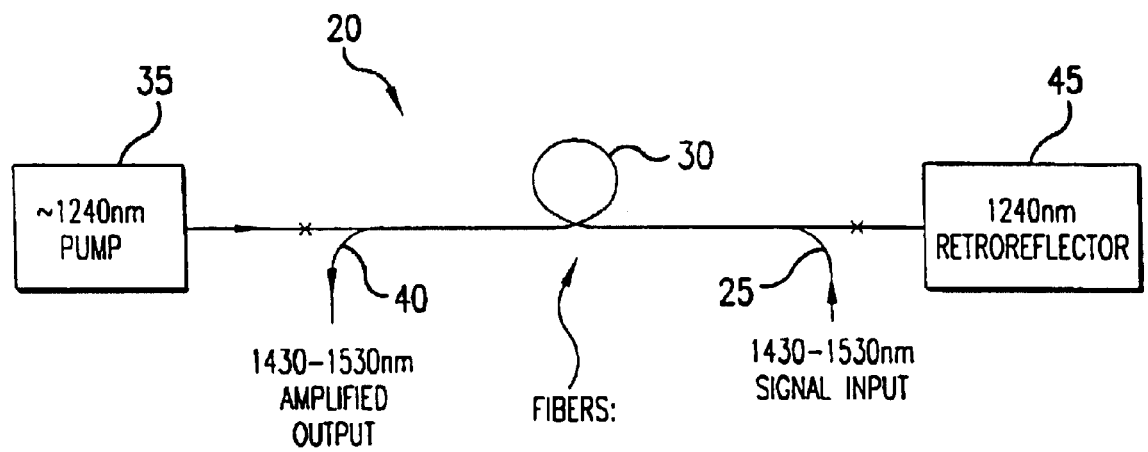
FIG. 9 is a schematic illustration of a first embodiment of an NLPA using an open-loop configuration.
Figure 9A:
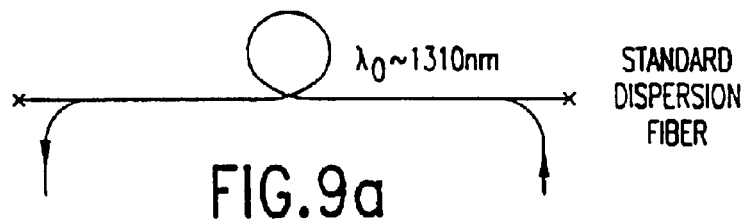
FIGS. 9a–c show the three choices of fibers.
Figure 9B:
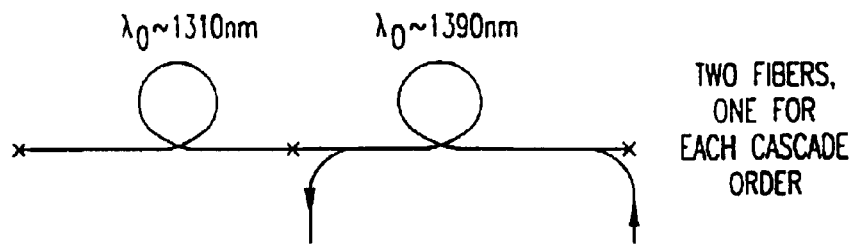
Figure 9C:
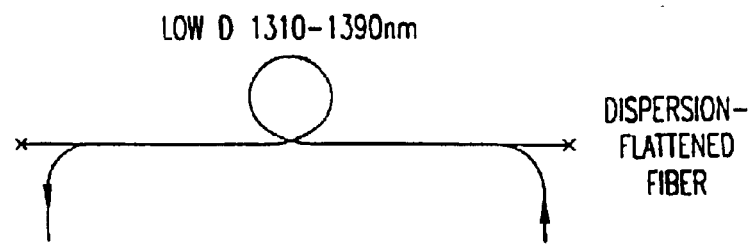

FIG. 9 shows a first embodiment of the invention which uses an open-loop design to produce an amplified broadband signal for a range of wavelengths between 1430 nm and 1530 nm. The open-loop design is the simplest nonlinear polarization amplifier although it may have a high pump power requirement. In the NLPA amplifier 20 as illustrated in FIG. 9, an optical signal having a wavelength between 1430 nm and 1530 nm is input from an input port 25 to an optical fiber 30. The optical fiber 30 is pumped by a pumping light generated by a pumping laser 35 operated at a wavelength of about 1240 nm. The optical signal is amplified and spectrally broadened in the fiber by nonlinear polarization, and output through an output port 40. The configuration is so arranged that the optical signal has a wavelength greater than the zero-dispersion wavelength of the fiber, which in turn is greater than the pumping wavelength of 1240 nm.

In this open-loop configuration, the fiber must have a cut-off wavelength below 1240 nm to be single-mode (spatial) over all wavelengths of the Raman cascade. Three choices of the fiber are preferred in this configuration. First, a standard dispersion fiber with a zero-dispersion wavelength at about 1310 nm. Second, two fibers spliced together with one fiber having a zero-dispersion wavelength at about 1310 nm (first cascade) and the other at 1390 nm (second cascade). Third, a dispersion-flattened fiber with low-dispersion at least between 1310 nm and 1390 nm. The reduced dispersion slope of such a dispersion-flattened fiber increases significantly the bandwidth for PA or 4WM.

Exemplary 1240 nm pump lasers include: (a) an 1117 nm cladding-pumped fiber laser followed by a coupler-based or grating-based Raman oscillator cavity (with gratings for 1117 nm, 1175 nm and 1240 nm); (b) an optically-pumped semiconductor laser; or (c) a chromium-doped forsterite laser. At one end of the fiber, a 1240 nm retro-reflector 45 is preferably placed to increase pumping conversion efficiency. The retro-reflector is preferably a dichroic mirror or a 1240 nm grating. The input and output ports are preferably WDM couplers, and isolators should be used at the input and output ports to prevent from lasing due to spurious feedback. It is desirous to use a counter-propagating geometry to average out noise fluctuations in this open-loop configuration. It is also possible to use a co-propagating geometry.

Figure 10:
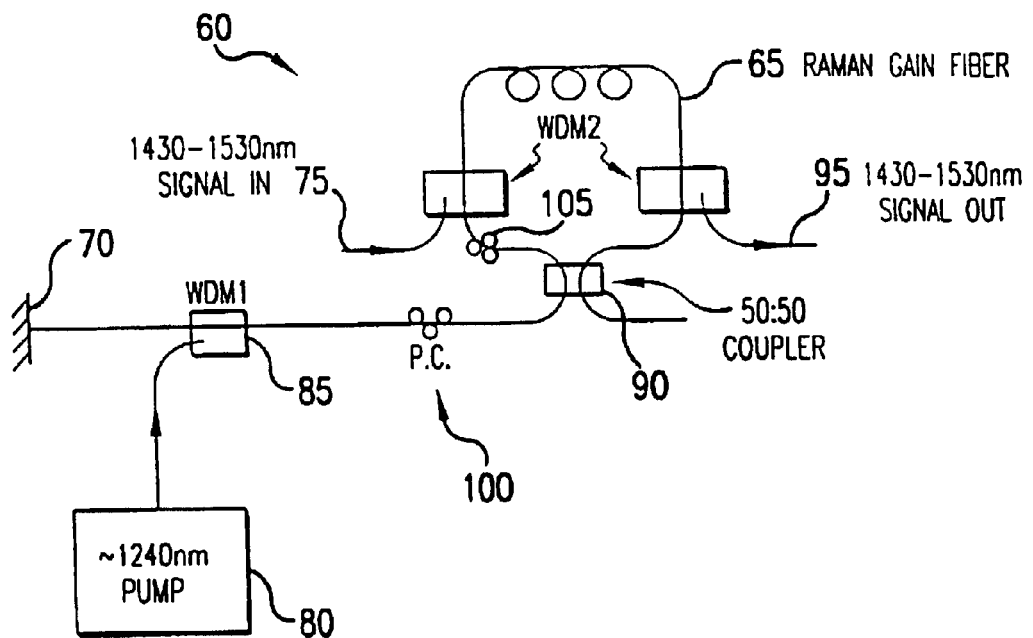
FIG. 10 is a schematic illustration of a second embodiment of an NLPA using a Sagnac Raman cavity that is pumped at 1240 nm.

To reduce the pump power requirements, a broadband cavity such as the Sagnac Raman cavity is used. FIG. 10 illustrates an embodiment of the NLPA that uses a Sagnac Raman cavity design with a 1240 nm pump. Referring to FIG. 10, the Sagnac Raman cavity of the NLPA 60 is formed by a broadband mirror 70 and a loop mirror comprising a Raman gain fiber 65 and an optical coupler 90 connected thereto. The Sagnac Raman cavity design is described in a U.S. patent application Ser. No. 08/773,482, and this patent application is incorporated herein by reference. An optical signal having a wavelength between 1430 nm to 1530 nm is input through an input port 75 to the Raman gain fiber 65. A pumping laser 80 operated at a wavelength 1240 nm generates a pumping light that pumps the fiber 65 through a coupling means 85. The optical signal is amplified and spectrally broadened in the fiber by nonlinear polarization, and output through an output port 95. The configuration is so arranged that the optical signal has a wavelength greater than the zero-dispersion wavelength of the fiber, which in turn is greater than the pumping wavelength of 1240 nm.

The Raman gain fiber has the same characteristics as described above for the open-loop design. Similarly, the pumping lasers used in the first embodiment are used in this second embodiment. The broadband NLPA may further include a polarization controller 100 in the Sagnac Raman cavity for controlling polarization state. However, if the fiber is polarization maintained, the polarization controller is not necessary. The optical coupler 90 is nominally 50:50 at least for the optical signal having a wavelength between about 1240 nm and 1430 nm. The coupling means 85 is a WDM coupler which transmits at least at a wavelength between about 1300 nm and 1430 nm. Moreover, the input port and output port each comprises a WDM coupler which transmits at least at a wavelength between about 1240 nm and 1425 nm. A key advantage of the Sagnac Raman cavity is that it has a passive noise dampening property that leads to quieter cascading of various Raman orders.

Figure 11:
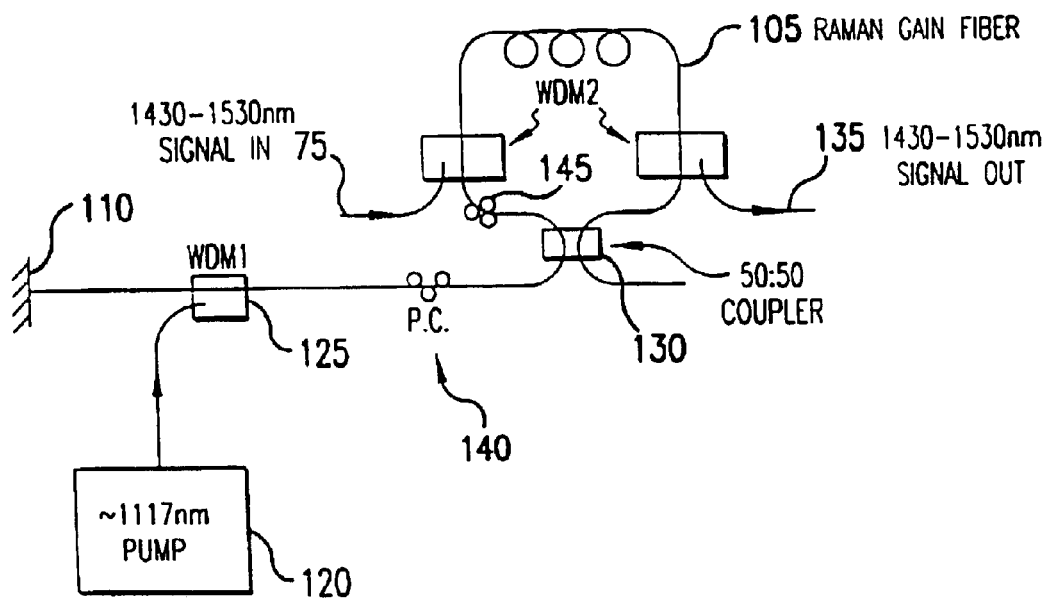
FIG. 11 is a schematic illustration of a third embodiment of an NLPA using a Sagnac Raman cavity that is pumped at 1117 nm.

As an alternative, the same kind of Sagnac Raman cavity can be used for all five Raman cascade orders between 1117 nm and the low-loss window. FIG. 11 illustrates a third embodiment of a five-order Sagnac Raman amplifier for NLPA operation. A cladding-pumped fiber laser operating around 1117 nm is used as a pumping laser 120. Different fiber combinations described in the first embodiment can be used except that the fibers must have a cut-off wavelength below 1117 nm to accommodate single-mode operation for the pump. An optical coupler 130 is nominally 50:50 at least for the optical signal having the wavelength between about 1117 nm and 1430 nm. A coupling means 125 is a WDM coupler which transmits at least at wavelengths between about 1165 nm and 1430 nm. Moreover, the input and output ports each comprises a WDM coupler which transmits at least at wavelengths between about 1117 nm and 1425 nm. Although the wavelength range of the various components increases, this configuration leads to an even broader gain band since the pump bandwidth is allowed to increase even during the first two cascades between 1117 nm and 1240 nm. Also, the noise dampening property of the Sagnac cavity can be used advantageously over all five Raman orders.

In general, the NLPA is operated as follows. An optical signal having a wavelength $\lambda$ is input through an input port into a distributed gain medium having zero-dispersion at a wavelength $\lambda_0$, such as an optical fiber, which is pumped by a pumping light from a pumping means operated at a wavelength $\lambda_p$, wherein $\lambda \geq \lambda_0 > \lambda_p$. The pumping light cascades through the distributed gain medium a plurality of Raman orders including an intermediate order having a wavelength $\lambda_r$ at a close proximity to the zero-dispersion wavelength $\lambda_0$ to phase match four-wave mixing (if $\lambda_r < \lambda_0$) or parametric amplification (if $\lambda_r > \lambda_0$). The amplified and spectrally broadened optical signal is output through an output port.

7. Broadband Parallel Optical Amplification Apparatus

The above embodiments demonstrate that a single NLPA can accommodate the full bandwidth of the low-loss window. Moreover, the full bandwidth of the low-loss window may be reached by using a parallel optical amplification apparatus having a combination of two or more Raman amplifiers and rare earth doped amplifiers. Preferably, the NLPAs and EDFAs are used.

Figure 12:
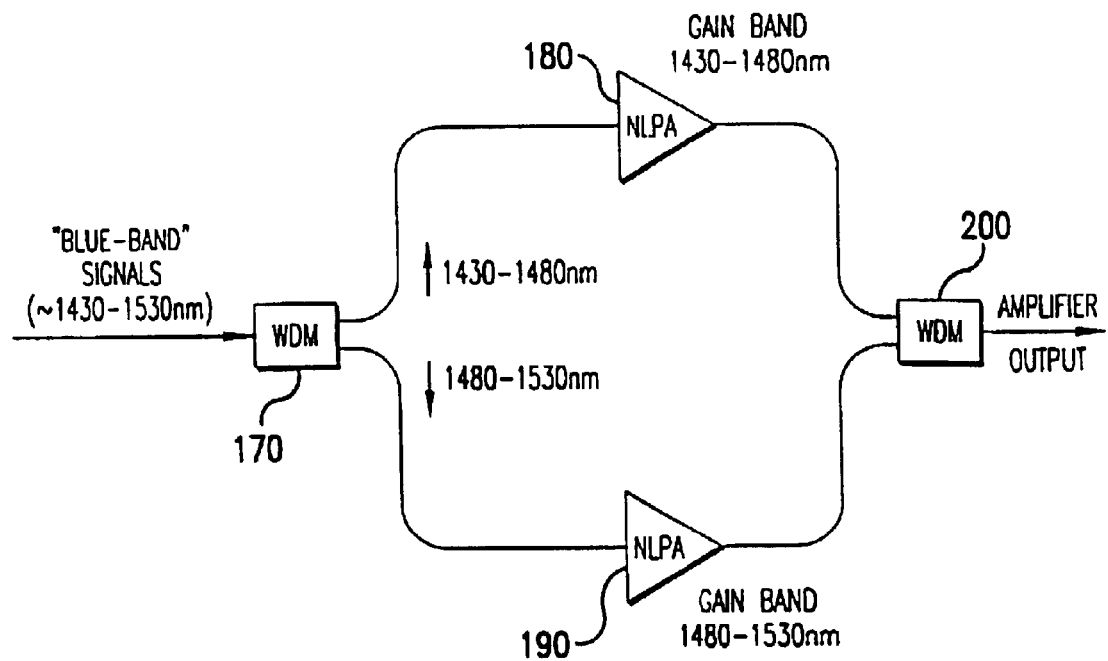
FIG. 12 is a schematic illustration of a first embodiment of a parallel optical amplification apparatus having two stages of NLPAs.

FIG. 12 shows a first embodiment of the parallel optical amplification apparatus using a combination of two NLPAs for a range of wavelengths between 1430 nm and 1530 nm. Referring to FIG. 12, a dividing means 170 divides an optical signal having a wavelength between 1430 nm to 1530 nm at a predetermined wavelength, preferably at 1480 nm, into a first beam having a wavelength less than the predetermined wavelength and a second beam having a wavelength greater than the predetermined wavelength. The first beam is input into a first NLPA 180 for amplification and spectral broadening therein. The second beam is input into a second NLPA 190 for amplification and spectral broadening therein. Outputs from the first and second NLPAs are combined by a combining means 200 to produce an amplified and spectrally broadened optical signal. The input port 170 and output port 200 are preferably WDM couplers.

It is preferred that the first NLPA 180 is optimized for 1430–1480 nm and centered at 1455 nm, while the second NLPA is optimized for 1480–1530 nm and centered at 1505 nm. From Table 1, these two windows can be achieved in a five-order cascade by starting with a pump wavelength of about 1100 nm for the short-wavelength side and a pump wavelength of about 1130 nm for the long-wavelength side. For the short-wavelength side, the fiber should have a zero-dispersion around 1365 nm, while for the long-wavelength side, the fiber zero-dispersion should be around 1328 nm or 1410 nm.

The narrower-bandwidth for each NLPA will also lead to an increased efficiency for each amplifier. Furthermore, the components may be more easily manufactured, since the wavelength window is not as large. Finally, the multiple amplifiers may allow for gradual upgrades of systems, adding bandwidth to the EDFA window as needed.

Figure 13:
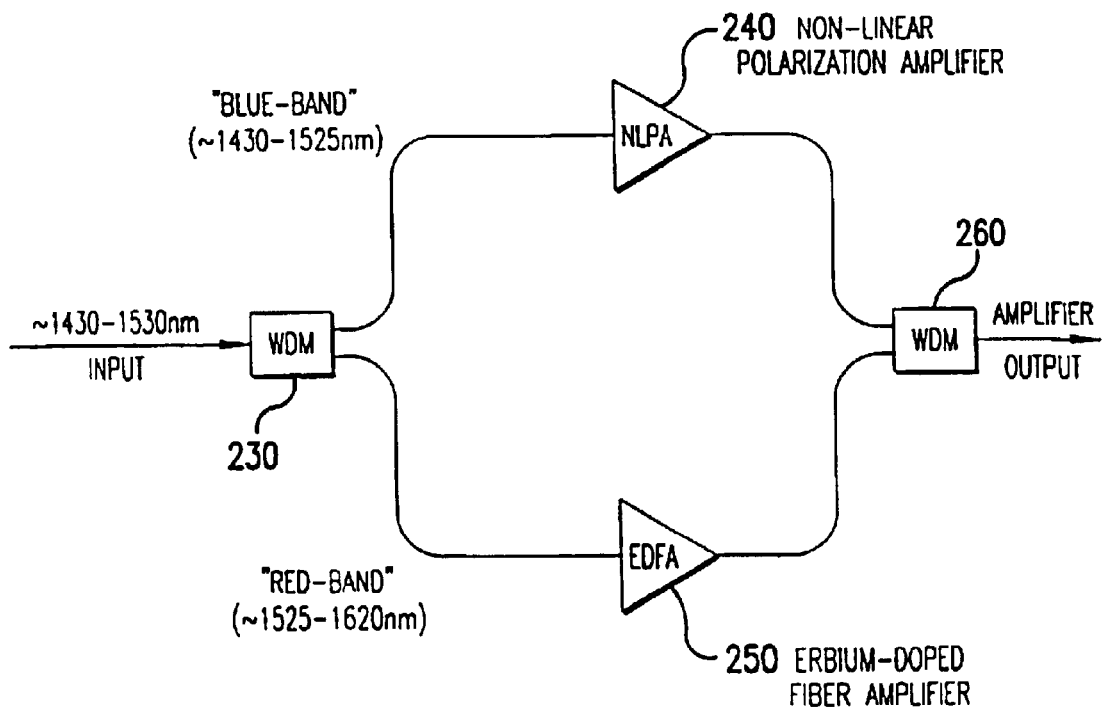
FIG. 13 is a schematic illustration of a second embodiment of a parallel optical amplification apparatus that is a combination of an EDFA and an NLPA.

A spectrum of 1430–1620 nm in the low-loss window is amplified and spectrally broadened by using a parallel optical amplification apparatus comprising Raman amplifiers and rare earth doped amplifiers. FIG. 13 describes a second embodiment of the parallel optical amplification apparatus. The amplification apparatus comprises a broadband NLPA 240 as disclosed in this invention and a EDFA 250. A dividing means 230 of the apparatus divides an optical signal having a wavelength between 1430 nm and 1620 nm at a predetermined wavelength, preferably at 1525 nm, into a first beam having a wavelength less than the predetermined wavelength and a second beam having a wavelength greater than the predetermined wavelength. The broadband NLPA 240 receives the first beam and produces an amplified broadband first beam. The EDFA 250 receives the second beam and produces an amplified broadband second beam. A combining means 260 combines the amplified and spectrally broadened first and second beams to produce an amplified broadband optical signal. It is preferred that both the dividing means 230 and the combining means 260 are WDM couplers.

To use any of these embodiments with multi-wavelength WDM channels, it will most likely be necessary to include at the output of the amplifier some means for equalizing the gain. This wavelength dependency or nonuniformity of the gain band has little impact on single-channel transmission. However, it renders the amplifier unsuitable for multichannel operation through a cascade of amplifiers. As channels at different wavelengths propagate through a chain of amplifiers, they accumulate increasing discrepancies between them in terms of gain and signal-to-noise ratio. Using gain-flattening elements can significantly increase the usable bandwidth of a long chain of amplifiers. For example, the NLPA can be followed by a gain flattening element to provide gain equalization for different channels. Alternately, the gain flattening element could be introduced directly into the Sagnac interferometer loop of FIG. 10 or 11.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A nonlinear polarization amplifier stage comprising:
   a gain medium operable to receive a multiple wavelength optical signal comprising wavelengths within a range $\lambda_s$;
   a pump operable to generate at least one pump wavelength $\lambda_p$ for introduction to the gain medium; and
   a coupler operable to introduce the at least one pump wavelength to the gain medium to facilitate Raman amplification of at least a portion of the multiple wavelength optical signal;
   wherein at least an intensity of the at least one pump wavelength is selected to affect the shape of a gain curve associated with the multiple wavelength optical signal in the amplifier stage; and
   wherein at least a portion of the gain medium comprising a zero-dispersion wavelength $\lambda_0$, which is less than or equal to at least one signal wavelength $\lambda_s$ and greater than or equal to $\lambda_p$.

2. The nonlinear polarization amplifier stage of claim 1, wherein the gain medium comprises a distributed gain medium.

3. The nonlinear polarization amplifier stage of claim 1, wherein the gain medium comprises an optical fiber.

4. The nonlinear polarization amplifier stage of claim 1, wherein the zero-dispersion wavelength comprises approximately 1310 nanometers.

5. The nonlinear polarization amplifier stage of claim 1, wherein the zero-dispersion wavelength comprises approximately 1550 nanometers.

6. The nonlinear polarization amplifier stage of claim 1, wherein the zero-dispersion wavelength is within a range of 1390 nanometers and 1540 nanometers.

7. The nonlinear polarization amplifier stage of claim 1, wherein the wavelength range $\lambda_s$ resides within a wavelength range of 1430 to 1530 nanometers.

8. The nonlinear polarization amplifier stage of claim 1, wherein at least a portion of the gain medium comprises a zero-dispersion wavelength $\lambda_0$, which is within thirty (30) nanometers of $\lambda_p$.

9. The nonlinear polarization amplifier stage of claim 1, wherein the pump comprises part of a pump assembly operable to generate a plurality of pump wavelengths within a wavelength range $\lambda_{p1}$–$\lambda_{pn}$.

10. The nonlinear polarization amplifier stage of claim 9, wherein the pump assembly comprises a grating based Raman oscillator pumped by a cladding-pumped fiber laser.

11. The nonlinear polarization amplifier stage of claim 9, wherein at least a portion of the gain medium comprises a zero-dispersion wavelength $\lambda_0$, which is less than or equal to at least one wavelength $\lambda_s$ and greater than or equal to at least one pump wavelength $\lambda_p$ of the plurality of pump wavelengths.

12. The nonlinear polarization amplifier stage of claim 9, wherein at least a portion of the gain medium comprises a zero-dispersion wavelength $\lambda_0$, which is within thirty (30) nanometers of at least one pump wavelength $\lambda_p$ of the plurality of pump wavelengths.

13. The nonlinear polarization amplifier stage of claim 9, wherein the wavelengths or the intensities of at least some of the plurality of pump wavelengths are selected to affect the shape of the gain curve associated with the multiple wavelength optical signal in the amplifier stage.

14. The nonlinear polarization amplifier stage of claim 9, further comprising a controller operable to control wavelengths of the pump signals output from the pump assembly to affect the shape of the amplifier gain curve.

15. The nonlinear polarization amplifier stage of claim 9, wherein at least some of the plurality of pump wavelengths differ by at least twenty (20) nanometers.

16. The nonlinear polarization amplifier stage of claim 9, wherein at least some of the plurality of pump wavelengths differ by seventy (70) nanometers or less.

17. A method of controlling the shape of a gain curve of a nonlinear polarization amplifier stage, comprising:
receiving a multiple wavelength signal at a gain medium of a Raman amplifier stage, wherein the wavelengths of the multiple wavelength signal are within a wavelength range $\lambda_s$;
selecting at least an intensity of a pump signal, wherein the resulting pump signal comprises a wavelength $\lambda_p$; and
introducing the pump signal to the gain medium to facilitate amplification of at least a portion of the multiple wavelength signal over at least a portion of the gain medium;
wherein the shape of a gain curve for the amplifier stage is determined at least in part based on the selection of the wavelength or intensity of the pump signal; and
wherein at least a portion of the gain medium comprises a zero-dispersion wavelength $\lambda_0$, which is less than or equal to at least one wavelength $\lambda_s$ and greater than or equal to $\lambda_p$.

18. The method of claim 17, wherein the gain medium comprises a distributed gain medium.

19. The method of claim 18, wherein the distributed gain medium provides distributed Raman amplification.

20. The method of claim 17, wherein the zero-dispersion wavelength comprises approximately 1310 nanometers.

21. The method of claim 17, wherein the zero-dispersion wavelength comprises approximately 1550 nanometers.

22. The method of claim 17, wherein the zero-dispersion wavelength is within a range of 1390 nanometers and 1540 nanometers.

23. The method of claim 17, wherein the wavelength range $\lambda_s$ comprises 1430 to 1530 nanometers.

24. The method of claim 17, wherein at least a portion of the gain medium comprises a zero-dispersion wavelength $\lambda_0$, which is within thirty (30) nanometers of $\lambda_p$.

25. The method of claim 17, wherein the pump signal comprises a multiple wavelength pump signal comprising a plurality of pump wavelengths within a wavelength range $\lambda_{p1}$–$\lambda_{pn}$.

26. The method of claim 25, wherein selecting at least an intensity of the pump signal comprises selecting at least an intensity of at least some of a plurality of pump wavelengths.

27. The method of claim 25, wherein the intensities of at least some of the plurality of pump wavelengths are selected to affect the shape of the gain curve associated with the multiple wavelength optical signal in the amplifier stage.

28. The method of claim 25, further comprising changing the wavelength of a pump signal communicated to the gain medium to affect the shape of the gain curve associated with the multiple wavelength optical signal in the amplifier stage.

29. The method of claim 25, wherein at least some of the plurality of pump wavelengths differ by at least twenty (20) nanometers.

30. The method of claim 25, wherein at least some of the plurality of pump wavelengths differ by seventy (70) nanometers or less.

31. The method of claim 17, wherein at least a portion of the gain medium comprises a zero-dispersion wavelength $\lambda_0$, which is within thirty (30) nanometers of at least one pump wavelength $\lambda_p$ of the plurality of pump wavelengths.

32. A nonlinear polarization amplifier stage comprising:
a gain medium operable to receive a multiple wavelength optical signal comprising wavelengths within a range $\lambda_s$, at least a portion of the gain medium comprising a zero-dispersion wavelength $\lambda_0$;
a pump operable to generate at least one pump wavelength $\lambda_p$ for introduction to the gain medium, wherein the at least one pump wavelength $\lambda_p$ is within thirty (30) nanometers of the zero-dispersion wavelength $\lambda_0$; and
a coupler operable to introduce the at least one pump wavelength to the gain medium to facilitate Raman amplification of at least a portion of the multiple wavelength optical signal;
wherein at least an intensity of the at least one pump wavelength is selected to affect the shape of a gain curve associated with the multiple wavelength optical signal in the amplifier stage.

33. A method of controlling the shape of a gain curve of a nonlinear polarization amplifier stage, comprising:

receiving a multiple wavelength signal at a gain medium of a Raman amplifier stage, at least a portion of the gain medium comprising a zero-dispersion wavelength $\lambda_0$, wherein the wavelengths of the multiple wavelength signal are within a wavelength range $\lambda_s$;

selecting at least an intensity of a pump signal, wherein the resulting pump signal comprises a wavelength $\lambda_p$ and wherein the wavelength $\lambda_p$ is within thirty (30) nanometers of the zero-dispersion wavelength $\lambda_0$; and introducing the pump signal to the gain medium to facilitate amplification of at least a portion of the multiple wavelength signal over at least a portion of the gain medium;

wherein the shape of a gain curve for the amplifier stage is determined at least in part based on the selection of the wavelength or intensity of the pump signal.

* * * * *